(12) United States Patent
Chen et al.

(10) Patent No.: US 8,675,995 B2
(45) Date of Patent: Mar. 18, 2014

(54) PRECISELY LOCATING FEATURES ON GEOSPATIAL IMAGERY

(75) Inventors: Ching-Chien Chen, Temple City, CA (US); Dipsy Kapoor, Redondo Beach, CA (US); Craig A. Knoblock, El Segundo, CA (US); Cyrus Shahabi, Irvine, CA (US)

(73) Assignee: TerraGo Technologies, Inc., Atlanta, GA (US)

( * ) Notice: Subject to any disclaimer, the term of this patent is extended or adjusted under 35 U.S.C. 154(b) by 399 days.

(21) Appl. No.: 12/501,242

(22) Filed: Jul. 10, 2009

(65) Prior Publication Data
US 2011/0123066 A9   May 26, 2011

Related U.S. Application Data

(63) Continuation-in-part of application No. 11/169,076, filed on Jun. 28, 2005, now Pat. No. 7,660,441.

(60) Provisional application No. 60/586,623, filed on Jul. 9, 2004.

(51) Int. Cl.
G06K 9/32   (2006.01)

(52) U.S. Cl.
USPC ........... 382/294; 382/103; 382/113; 382/190; 382/201; 707/727; 707/741; 707/736

(58) Field of Classification Search
USPC .......... 382/103, 113, 190, 294, 201; 707/727, 707/741, 736
See application file for complete search history.

(56) References Cited

U.S. PATENT DOCUMENTS

| | | | |
|---|---|---|---|
| 4,891,761 A | 1/1990 | Gray et al. | |
| 5,546,107 A | 8/1996 | Deretsky et al. | |
| 6,597,818 B2 | 7/2003 | Kumar et al. | |
| 7,660,441 B2 | 2/2010 | Chen et al. | |
| 7,822,751 B2 | 10/2010 | O'Clair et al. | |
| 2001/0036302 A1 | 11/2001 | Miller | |
| 2001/0038718 A1 | 11/2001 | Kumar et al. | |
| 2003/0068071 A1 | 4/2003 | Wilson | |
| 2005/0065959 A1 | 3/2005 | Smith et al. | |
| 2005/0100220 A1 | 5/2005 | Keaton et al. | |
| 2006/0101005 A1 | 5/2006 | Yang et al. | |
| 2007/0014488 A1 | 1/2007 | Chen et al. | |
| 2009/0089254 A1 | 4/2009 | Von Kaenel et al. | |
| 2009/0285487 A1 | 11/2009 | Knoblock et al. | |

(Continued)

OTHER PUBLICATIONS

Chen et al: "Automatically annotating and integrating spatial datasets", Springer-Verlag Berlin Heidelberg, pp. 469-488, 2003.*

(Continued)

Primary Examiner — Ruiping Li
(74) Attorney, Agent, or Firm — Carr & Ferrell LLP

(57) ABSTRACT

Methods for locating a feature on geospatial imagery and systems for performing those methods are disclosed. An accuracy level of each of a plurality of geospatial vector datasets available in a database can be determined. Each of the plurality of geospatial vector datasets corresponds to the same spatial region as the geospatial imagery. The geospatial vector dataset having the highest accuracy level may be selected. When the selected geospatial vector dataset and the geospatial imagery are misaligned, the selected geospatial vector dataset is aligned to the geospatial imagery. The location of the feature on the geospatial imagery is then determined based on the selected geospatial vector dataset and outputted via a display device.

17 Claims, 9 Drawing Sheets

(56) References Cited

U.S. PATENT DOCUMENTS

2011/0119265 A1      5/2011    Shahabi et al.
2011/0142347 A1      6/2011    Chen et al.
2011/0280453 A1    11/2011    Chen et al.

OTHER PUBLICATIONS

Zhou, Y. et al, Hybrid index structures for location-based web search, CIKM, 2005.
Hariharan, R. et al , Processing Spatial-Keyword (SK) Queries in Geographic Information Retrieval (GIR) Systems, SSDBM, 2007.
De Felipe, I. et al , Keyword Search on Spatial Databases, ICDE, 2008.
Cong, G. et al, Efficient Retrieval of the Top-k Most Relevant Spatial Web Objects, VLDB 2009.
Zhang, D. et al, Keyword Search in Spatial Databases: Towards Searching by Document, ICDE, 2009.
Chen, Y. et al , Efficient query processing in geographic web search engines, SIGMOD, 2006.
Jones, C. B. et al , The SPIRIT Spatial Search Engine: Architecture, Ontologies and Spatial Indexing, GIS, 2004.
Gianinetto et al. "Fusion of Aerial and Satellite Imagery Over the City of Venezia." 2nd GRSS/ISPRS Joint Workshop on Remote Sensing and Data Fusion over Urban Areas, May 22-23, 2003, pp. 216-219.
Martins et al. "Indexing and Ranking in Geo-IR Systems", Proceedings of the 2005 workshop on Geographic information retrieval, pp. 31-34.
Doytsher. "A rubber sheeting algorithm for non-rectangle maps", Computer & Geosciences, 26, 2000.
Final Office Action, mailed Jul. 10, 2013, U.S. Appl. No. 12/152,546, filed May 14, 2008.
Notice of Allowance, mailed Sep. 16, 2013, U.S. Appl. No. 12/619,554, filed Nov. 16, 2009.
Final Office Action, mailed Apr. 22, 2013, U.S. Appl. No. 12/965,725, filed Dec. 10, 2010.
Notice of Allowance, mailed Nov. 12, 2013, U.S. Appl. No. 12/152,546, filed May 14, 2008.

* cited by examiner

PRECISELY LOCATING FEATURES ON GEOSPATIAL IMAGERY

CROSS-REFERENCE TO RELATED APPLICATION

The present application is a continuation-in-part and claims the priority benefit of U.S. patent application Ser. No. 11/169,076 (now U.S. Pat. No. 7,660,441) filed Jun. 28, 2005 and entitled "System and Method for Fusing Geospatial Data," which claims priority benefit of U.S. provisional patent application No. 60/586,623 filed Jul. 9, 2004, and entitled "Automatically and Accurately Conflating Road Vector Data, Street Maps, and Orthoimagery." The disclosures of U.S. patent application Ser. No. 11/169,076 and U.S. provisional application No. 60/586,623 are incorporated herein by reference.

GOVERNMENT INTERESTS

The research and development described in this application were supported by the Defense Advanced Research Projects Agency (DARPA) under contract number W31P4Q-07-C-0261 and the National Science Foundation (NSF) under contract number IIP-0712287. The U.S. Government has certain rights in the claimed inventions.

BACKGROUND OF THE INVENTION

1. Field of the Invention

The present invention relates generally to geospatial data processing. More specifically, the present invention relates to precisely locating features on geospatial imagery.

2. Related Art

Geospatial imagery includes images of the Earth's surface taken from the air or from space. In combination with corresponding geospatial vector data, approximate locations of features on geospatial imagery can be determined. Such features may include buildings, roads, parcels, geological features, and so forth. Geospatial vector data can be any type of data that associates spatial attributes such as latitude and longitude coordinates to various sites on the Earth's surface. Geospatial vector data may also include non-spatial attributes like road names, house numbers, ZIP codes, ownership information, associated telephone numbers, tax information, valuation information, and so on.

Unfortunately, geospatial imagery and corresponding geospatial vector data are rarely mutually aligned. Misalignment between geospatial imagery and geospatial vector data can be caused by any number of variables. For example, geospatial imagery can be distorted due to the curvature of the Earth, the angle at which a given geospatial image was taken, minor movements in an imaging platform (e.g., a satellite or aircraft), and other errors associated with imaging techniques.

Due in part to the common misalignment between geospatial imagery and corresponding geospatial vector data, traditional approaches for locating features on geospatial imagery may not be accurate enough for commercial applications. Moreover, other approximations used in traditional approaches can further these inaccuracies. One existing approach for locating a specific address or property on geospatial imagery is to infer a location based on road vector data interpolation. Road vector data interpolation can be performed on a given road segment when the address number range as well as the latitude and longitude of the endpoints of that road segment are known. Using road vector data interpolation, a determined location of an address or property, relative to the actual location on the geospatial imagery, can have a substantial margin of error (e.g., 50 or more meters). Other similar existing approaches infer locations by interpolating between opposing corners of a given geospatial image, thus potentially resulting in even more drastic margins of error. A large margin of error in locating features on geospatial imagery can hinder usefulness in many various applications. As such, there is a need for improved techniques to precisely locate features on geospatial imagery using available geospatial data.

SUMMARY OF THE INVENTION

Embodiments of the present technology allow features on geospatial imagery to be precisely located using the most accurate available data. The features may include businesses, residences, hospitals, geological features, roads, or any other feature associated with the geospatial imagery. Margin of error in locating features on geospatial imagery is minimized using available geospatial vector data. When multiple geospatial vector datasets are available for a given region, the most accurate geospatial vector dataset may be utilized. A misalignment between a geospatial vector dataset and corresponding geospatial imagery can be corrected.

In a first claimed embodiment, a method for locating a feature on geospatial imagery is disclosed. A first geospatial vector dataset is selected from the plurality of geospatial vector datasets. The first geospatial vector dataset has the highest accuracy level of each geospatial vector dataset in the plurality of geospatial vector datasets. The selected geospatial vector dataset is aligned to the geospatial imagery. The location of the feature is determined on the geospatial imagery based on the selected geospatial vector dataset. The location of the feature is provided via an output device.

In a second claimed embodiment, a device for locating a feature on geospatial imagery is set forth. The device includes a memory for storing a program and a processor for executing the program. An evaluation module, alignment engine, and locator module are all stored in the memory and executable by the processor. The evaluation module determines an accuracy level of each of a plurality of geospatial vector datasets available in a database. The evaluation module may also select the geospatial vector dataset having the highest accuracy level, where each of the plurality of geospatial vector datasets corresponding to the same spatial region as the geospatial imagery. The alignment engine aligns the selected geospatial vector dataset to the geospatial imagery. The locator module determines the location of the feature on the geospatial imagery based on the selected geospatial vector dataset.

A third claimed embodiment sets forth a computer-readable storage medium having a program embodied thereon. The program is executable by a processor to perform a method for locating a feature on geospatial imagery. The method involves selecting a first geospatial vector dataset of the plurality of geospatial vector datasets. The first geospatial vector dataset has a highest accuracy level of each geospatial vector dataset in the plurality of geospatial vector datasets. The first geospatial vector dataset is aligned to the geospatial imagery. The location of the feature is determined on the geospatial imagery based on the selected geospatial vector dataset.

DETAILED DESCRIPTION OF EXEMPLARY EMBODIMENTS

The present technology minimizes errors in locating features on geospatial imagery using available geospatial vector data. The accuracy of geospatial vector data available for a given region can vary drastically depending, for instance, on techniques used for acquisition. Additionally, two or more geospatial vector datasets of differing accuracies may be available for the same region. For example, road vector data and parcel vector data may be available for one spatial region. When multiple geospatial vector datasets are available for a given region, the most accurate geospatial vector dataset can be determined and selected. Furthermore, if the most accurate geospatial vector dataset is not well aligned to corresponding geospatial imagery, misalignment in that geospatial vector data can be corrected.

Figure 1:
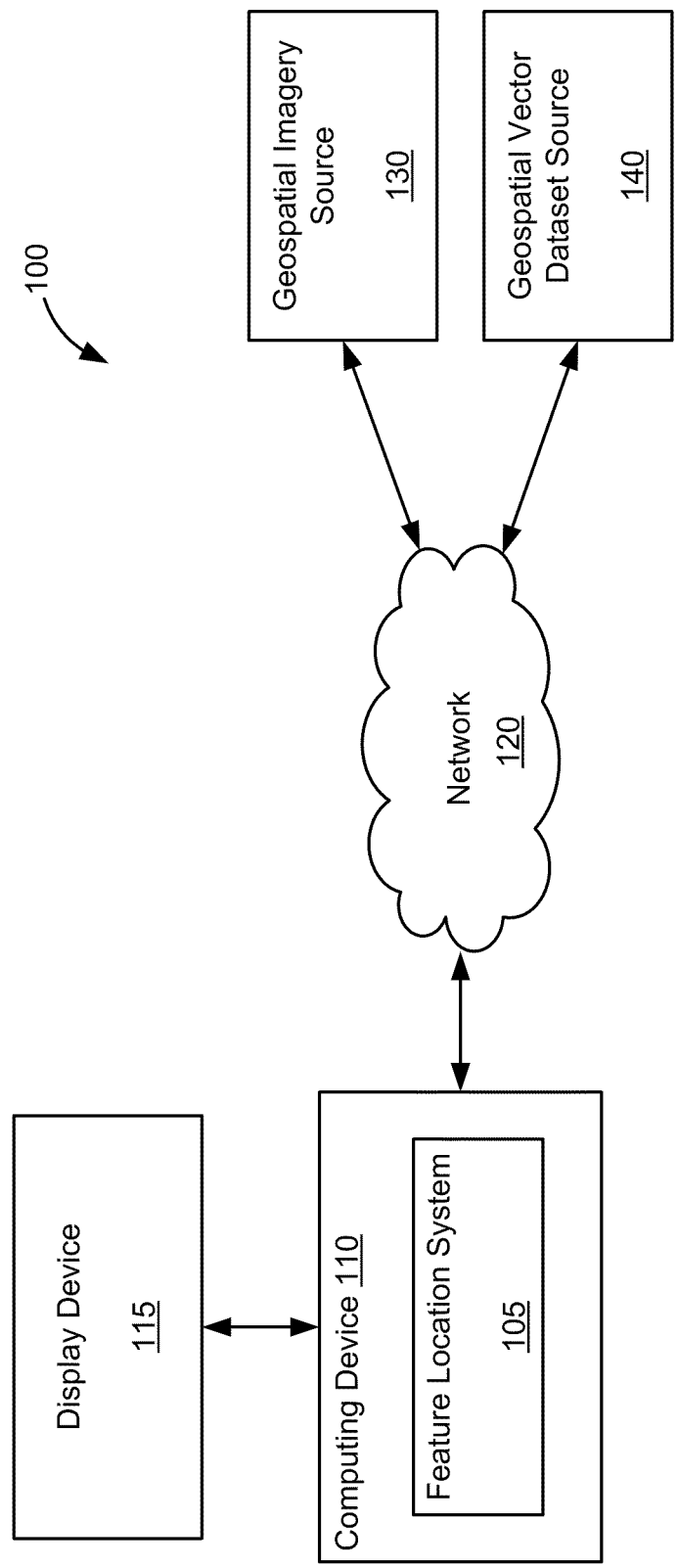
FIG. 1 is a block diagram of an exemplary environment for practicing embodiments of the present technology.

Referring now to FIG. 1, a block diagram of an exemplary environment 100 for practicing embodiments of the present technology is shown. The environment 100 includes a computing device 110, geospatial imagery source 130 and geospatial vector dataset source 140. Computing device 110 includes feature location system 105 which can be connected to display device 115 and may communicate with geospatial imagery source 130 and a geospatial vector dataset source 140. The feature location system 105 is discussed in further detail in connection with FIG. 2. Other various components (not shown) that are not necessary for describing the present technology may also be included in the environment 100, in accordance with exemplary embodiments. Examples of the computing device 110 may be a desktop personal computer (PC), a laptop PC, a pocket PC, a personal digital assistant (PDA), a smart phone, a cellular phone, a global positioning system (GPS) device, and so on. Computing device 110 is discussed in more detail with respect to FIG. 9.

The geospatial imagery source 130 can comprise any repository, compilation, database, server, or other source of geospatial imagery. Similarly, the geospatial vector dataset source 140 may include any repository, compilation, database, server, or other source of geospatial vector data. The geospatial imagery source 130 and the geospatial vector dataset source 140 may be provided by a private organization or federal, state, or municipal governments. For example, the geospatial imagery source 130 may include the U.S. Geological Survey (USGS).

According to exemplary embodiments, feature location system 105 can access geospatial imagery source 130 and the geospatial vector dataset source 140 via a network 120, which can be implemented as any wide area network (WAN), local area network (LAN), the Internet, an intranet, a public network, a private network, a combination of these, or some other data transfer network. The geospatial imagery and geospatial vector data may be provided to the feature location system 105 via the computing device 110 as a computer readable storage medium read by the computing device 110, such as by compact disk.

Figure 2:
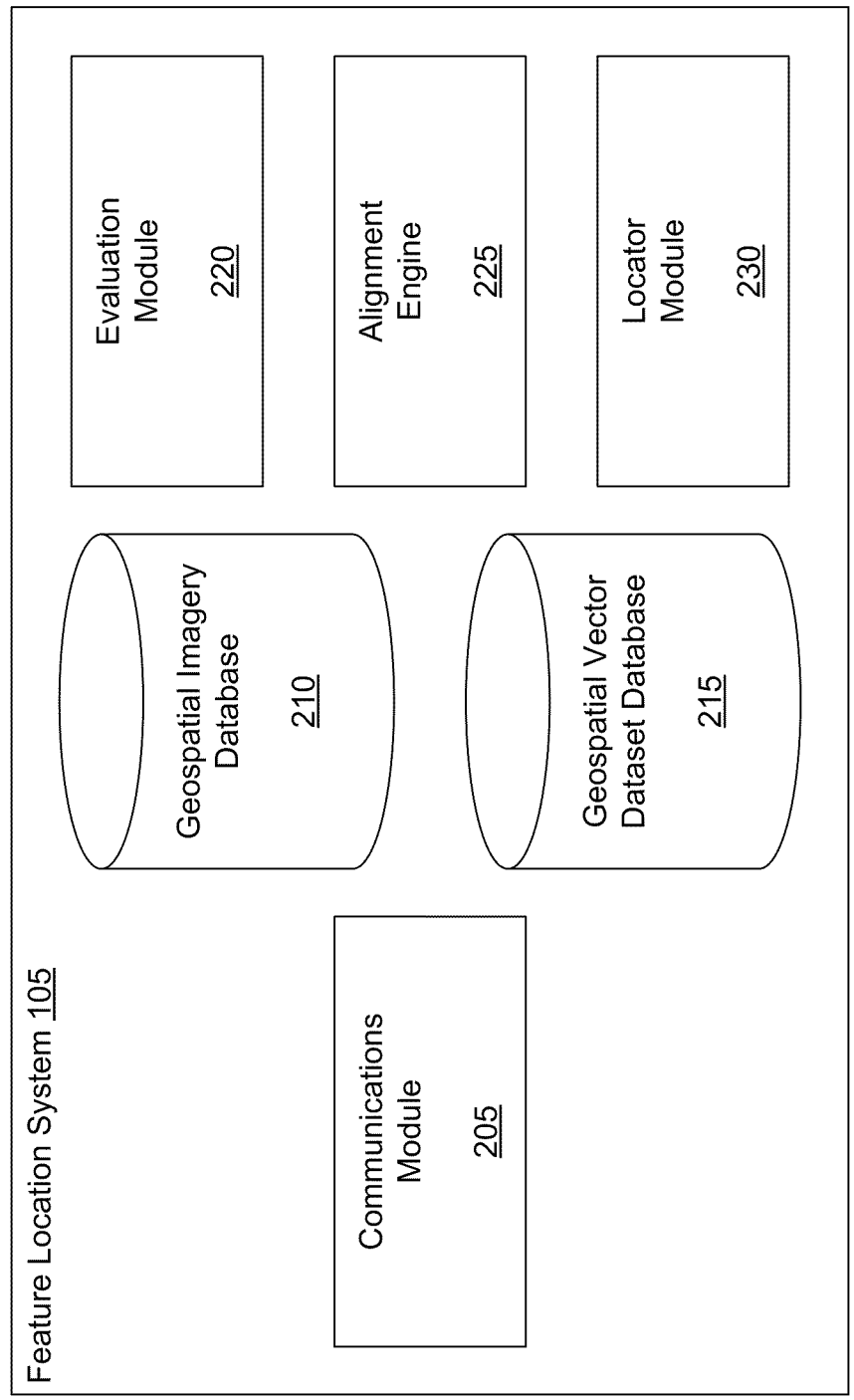
FIG. 2 is a block diagram of an exemplary feature location system.

FIG. 2 is a block diagram of the exemplary feature location system 105. As depicted, the feature location system 105 includes a communications module 205, a geospatial imagery database 210, a geospatial vector dataset database 215, an evaluation module 220, an alignment engine 225, and a locator module 230. Programs comprising engines, modules, and databases of the feature location system 105 may be stored in memory of the computing device 110. Additionally, the constituent engines and module can be executed by a processor of the computing device 110 to effectuate respective functionalities attributed thereto. It is noteworthy that the feature location system 105 can be composed of more or fewer modules and engines (or combinations of the same) and still fall within the scope of the present technology. For example, the functionalities of the alignment engine 225 and the functionalities of the locator module 230 may be combined into a single module or engine.

Execution of the communications module 205 facilitates communication of data and information between the feature location system 105 and the computing device 110. For example, geospatial imagery or geospatial vector data can be transferred to the feature location system 105 through execution of the communications module 205. Likewise, data and information can be provided to a user from the feature location system 105 by way of execution of the communications module 205. Additionally, the communications module 205 may be executed to provide communication between constituent engines, modules, and databases of the feature location system 105.

One or more various databases may be employed by the feature location system 105. According to exemplary embodiments, the geospatial imagery database 210 may store geospatial imagery obtained by the feature location system 105 from the geospatial imagery source 130. Similarly, the geospatial vector dataset database 215 may optionally store geospatial vector datasets obtained by the feature location system 105 from the geospatial vector dataset source 140. Such geospatial vector datasets may include building footprint vector datasets, parcel vector datasets, road vector dataset, other spatial and non-spatial datasets, or any combination thereof. The geospatial imagery database 210 and the geospatial vector dataset database 215 may be indexed or otherwise coordinated to so that corresponding geospatial imagery and geospatial vector datasets are associated. In some embodiment, the geospatial imagery database 210 and the geospatial vector dataset database 215 may be combined into a single database. According to other embodiments, the geospatial imagery database 210 and the geospatial vector dataset database 215 are not party of the feature location system 105, and geospatial imagery and geospatial data are processed as received from the geospatial imagery source 130 and the geospatial vector dataset source 140, respectively.

Execution of the evaluation module 220 allows an accuracy level to be determined for geospatial vector datasets in the geospatial vector dataset database 215. Generally speaking, each geospatial vector dataset may correspond to the same spatial region as a given geospatial image of interest. Accuracy levels are indicative of spatial resolution and of how well a geospatial vector dataset aligns with corresponding geospatial imagery. Examples of well-aligned and poorly-aligned geospatial vector datasets are discussed in connection with FIG. 4.

The evaluation module 220 may be further executed to select the geospatial vector dataset having the highest accuracy level. In exemplary embodiments, a margin of error in the proximity of a determined location of a particular feature and an actual location of that feature is at least partially dependent on the accuracy level of the selected geospatial vector dataset. The margin of error is characteristic of how precisely features can be located on geospatial imagery.

Various metrics may be utilized in determining or assigning an accuracy level to geospatial vector datasets. For example, an accuracy level of a given geospatial vector datasets may be determined based on, at least in part, a type of dataset included in the geospatial vector dataset. Accuracy levels may be determined based on the following types of datasets: (1) aligned building footprint vector data, (2) unaligned building footprint vector data, (3) aligned parcel vector data, (4) unaligned parcel vector data, (5) incomplete parcel vector data, (6) aligned road vector data, (7) unaligned road vector data, and (8) incomplete road vector data. Geospatial vector datasets that include aligned building footprint data may be regarded as having the highest accuracy level, while geospatial vector datasets that include incomplete road vector data may be regarded as having the lowest accuracy level.

As will be appreciated by those skilled in the art, aligned building footprint vector data includes data that defines peripheries of buildings and other structures, and is well aligned to those corresponding peripheries on imagery. Conversely, unaligned building footprint vector data also includes data that defines peripheries of buildings and other structures, but is not well aligned to those corresponding peripheries on imagery. An example of building footprint vector data is discussed in connection with FIG. 5.

Aligned parcel vector data includes data that defines peripheries of parcels, and is well aligned to those corresponding peripheries on imagery. Unaligned parcel vector data, in contrast, also includes data that defines peripheries of parcels, but is not well aligned to those corresponding peripheries on imagery. Examples of parcel vector data are described in connection with FIGS. 4 and 5.

Incomplete parcel vector data includes parcel vector data that incompletely describes addresses associated with certain parcels. For example, multiple addresses can exist on a single parcel, but not all of those addresses may be reflected in the available parcel vector data.

Aligned road vector data includes data that defines positions of roadways, and is well aligned to those corresponding positions on imagery. Unaligned road vector data includes data that defines positions of roadways, but is not well aligned to those corresponding positions on imagery. In some cases, road vector data may define the centerline of a given road and not the edges.

Incomplete road vector data includes road name information, but lacks address information such as house numbers. As such, ZIP code maps, area code maps, or other region-defining information may be used in conjunction with incomplete road vector data to better approximate the location of the feature by combining the geospatial extents inferred from multiple vector datasets. Incomplete road vector data may be the best geospatial vector data available in very remote parts of the world.

The alignment engine 225, or modules thereof, can be executed to align a selected geospatial vector dataset to corresponding geospatial imagery. Such alignment may be performed when selected geospatial vector dataset and corresponding geospatial imagery are misaligned. By performing improving alignment, a margin of error in the proximity of a determined location of a particular feature and an actual location of that feature can be minimized for the available geospatial vector dataset having the highest accuracy level. The alignment engine 225 is discussed in further detail in connection with FIG. 3.

Execution of the locator module 230 allows a location of a given feature on geospatial imagery to be determined. This determination may be based on a geospatial vector dataset corresponding to the geospatial imagery selected by the evaluation module 220. The location may be provided as an image coordinate, a pixel identification, a latitude and longitude coordinate, a marker placed on the geospatial imagery, and so forth. To mark a given parcel, for example, the centroid of that parcel found using coordinates of the parcel may be indicated by a red dot on the geospatial imagery.

Figure 3:
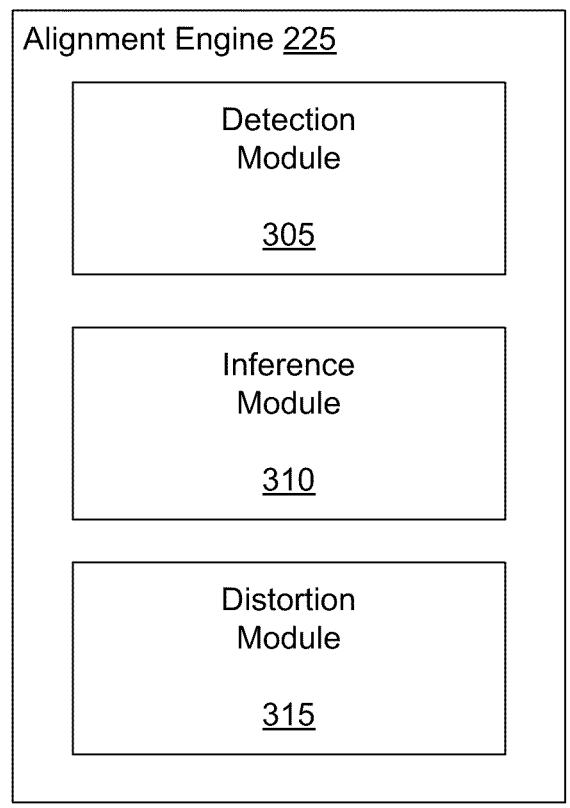
FIG. 3 is a block diagram of an exemplary alignment engine.

FIG. 3 is a block diagram of the exemplary alignment engine 225. The alignment engine 225, as depicted, includes a detection module 305, an inference module 310, and a distortion module 315. These modules can also be stored in memory of the computing device 110 and be executed by a processor of the computing device 110. Furthermore, the alignment engine 225 can be composed of more or fewer modules (or combinations of the same) and still fall within the scope of the present technology.

Execution of the detection module 305 allows a first group of control points in a selected geospatial vector dataset to be detected. A second group of control points on geospatial imagery corresponding to the selected geospatial vector dataset can also be detected via execution of the detection module 305. Control points mark certain points as 'land marks' of sort, both in the selected geospatial vector dataset and on the corresponding locations on geospatial imagery. Once detected, control points can be used during alignment of a geospatial vector data set to corresponding geospatial imagery. Additionally, filtering may be performed on control points such that any erroneous control points are disregarded. Exemplary processes in determining control points in a parcel vector dataset and on geospatial imagery are discussed, respectively, in connection with FIGS. 6 and 7.

Figure 7:
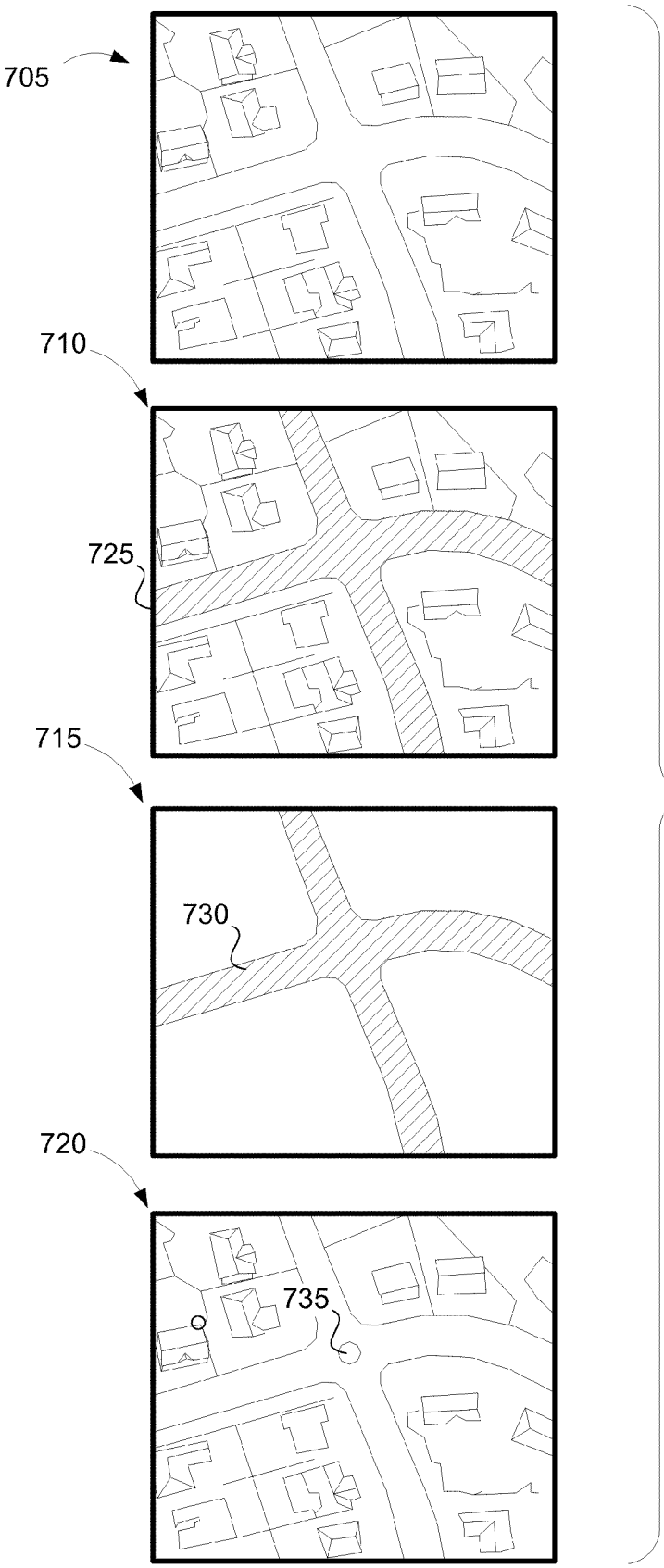
FIG. 7 illustrates an exemplary process in determining control points in geospatial imagery.

The inference module 310 may be executed to infer a template from the vector data, based on the detected control points and the locations, shapes, and directions of surrounding roads and parcels. An exemplary template is illustrated in FIG. 7. The inference module 310 may be also executed to infer the road pixels in color imagery. Templates may be used by the detection module 305 in detecting the corresponding control points on geospatial imagery by matching the templates with road pixels on the imagery.

According to exemplary embodiments, execution of the distortion module 315 allows a selected geospatial vector dataset to be distorted such that a first group of control points in the geospatial vector dataset is aligned with a second group of control points on corresponding geospatial imagery. Such distortion may be performed by rubber-sheeting the selected geospatial vector dataset in some embodiments.

Figure 4:
FIG. 4 illustrates examples of unaligned and aligned parcel vector data.

FIG. 4 illustrates examples of unaligned parcel vector data 405 and aligned parcel vector data 410. Both the unaligned parcel vector data 405 and the aligned parcel vector data 410 are overlaid on identical geospatial imagery. The misalignment of geospatial vector data such as illustrated by the unaligned parcel vector data 405 can result in an unacceptable margin of error in the proximity of a determined location of a given feature and an actual location of that feature of geospatial imagery. Furthermore, note that the unaligned parcel vector data 405 may coincide with parcels in parts of the geospatial imagery, but not in other parts. As such, simply linearly shifting the unaligned parcel vector data 405 with respect to the underlying geospatial imagery may not yield the aligned parcel vector data 410. Instead, rubber-sheeting, as mentioned in connection with the distortion module 315, can be used to distort the unaligned parcel vector data 405 to yield the aligned parcel vector data 410, in accordance with exemplary embodiments.

Figure 5:
FIG. 5 illustrates an example of aligned parcel and building footprint vector data overlaid on geospatial imagery.

FIG. 5 illustrates an example of aligned parcel vector data 505 and aligned building footprint vector data 510 overlaid on geospatial imagery. As with the aligned parcel vector data 410 of FIG. 4, the aligned parcel vector data 505 defines peripheries of parcels, and is well aligned to those peripheries. The aligned building footprint vector data 510, on the other hand, defines peripheries of buildings, and is well aligned to those peripheries. For a given address, the aligned building footprint vector data 510 can be used to precisely locate a building at that address. This can be particularly useful in densely populated areas where buildings are closely spaced. It is noteworthy that parcel vector data and building footprint vector data are commonly generated by and obtainable from the same source such as a municipal government.

Figure 6:
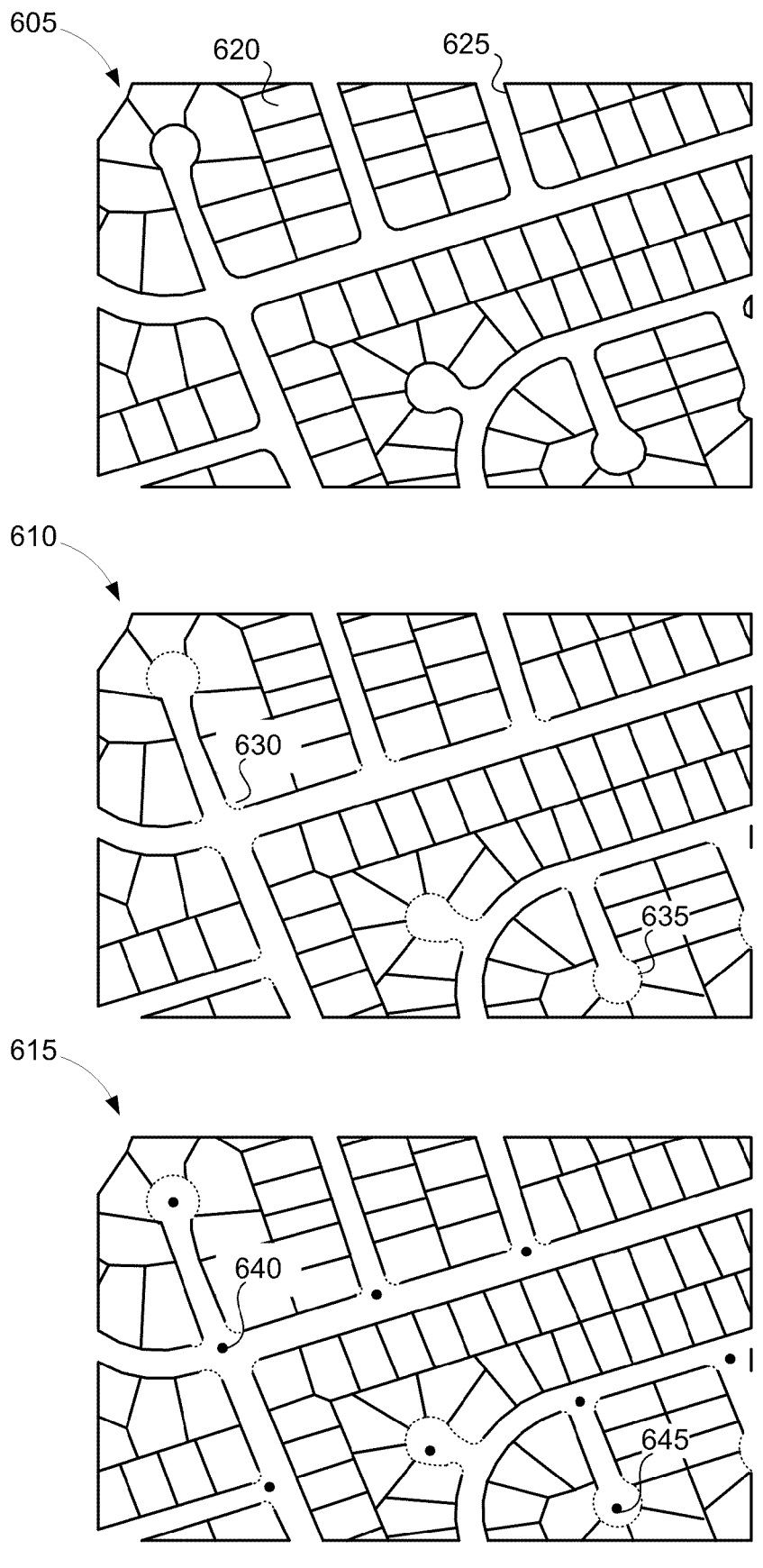
FIG. 6 illustrates an exemplary process in determining control points in a parcel vector dataset.

FIG. 6 illustrates an exemplary process in determining control points in a parcel vector dataset. Process steps may be added or subtracted from process steps 605, 610, and 615 and still fall within the scope of the present technology.

In process step 605, roadsides are located from the parcel vector dataset. According to exemplary embodiments, process step 605 may be performed by determining that portions of the parcel vector dataset that correspond to parcels such as parcel 620 are not roads. Thus, the remaining portions of the dataset are roads such as road 625. Roadsides can then be located from the portions of the parcel vector data that correspond to roads. In process step 610, salient points in the geospatial vector dataset are located such as salient points 630 and 635. Salient points can be points along a roadside in areas of high curvature, such as bends in a road, road intersections, cul-de-sacs, etc. In process step 615, representative points that each correspond to a cluster of salient points are designated as control points in the parcel vector dataset. A cluster of salient points may be a group of salient points within a certain radius. Examples of such representative points include control points 640 and 645. According to exemplary embodiments, a representative point of a cluster of salient points can be defined as the point at which the sum of displacements to all salient points in that cluster is zero.

FIG. 7 illustrates an exemplary process in determining control points in geospatial imagery. Process steps may be added or subtracted from process steps 705, 710, 715, and 720 and still fall within the scope of the present technology.

In process step 705, the geospatial imagery is analyzed to determine pixels that may correspond to roads. For example, in color imagery, grey pixels may be identified as potential road pixels. In process step 710, potential road pixels that are grouped to form lines or spurs may be identified as roads pixels such as road pixel 725. In process step 715, a template 730 is obtained from the vector data, based on the detected control points and the locations, shapes, and directions of surrounding roads and parcels. The template 730 may be inferred from the parcel vector data by the inference module 310 in exemplary embodiments. The template 730 may be used by the detection module 305 in detecting the corresponding control points on geospatial imagery by matching the template 703 with road pixels on the imagery identified in the process step 710. In process step 720, the matched points are designated as corresponding control points in the geospatial imagery such as control point 735.

Figure 8:
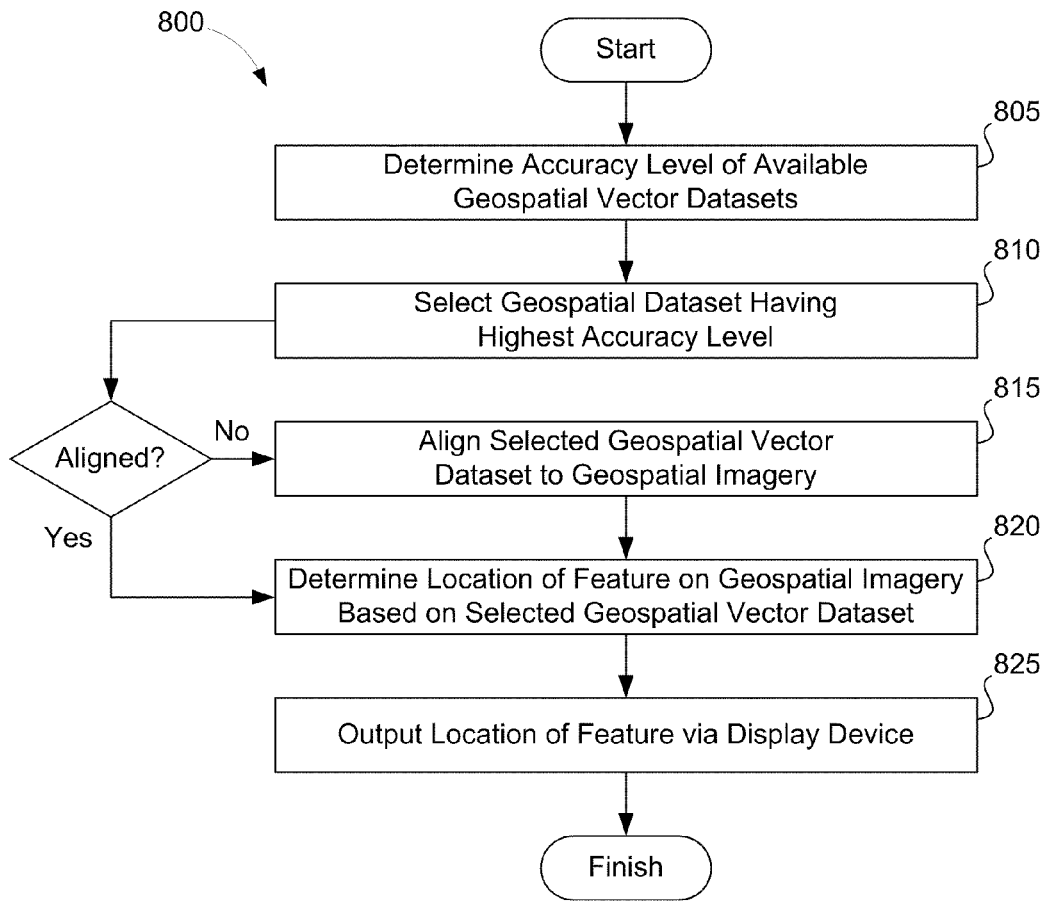
FIG. 8 is a flowchart of an exemplary method for locating a feature on geospatial imagery.

FIG. 8 is a flowchart of an exemplary method 800 for locating a feature on geospatial imagery. The steps of the method 800 may be performed in varying orders. Steps may be added or subtracted from the method 800 and still fall within the scope of the present technology.

In step 805, an accuracy level is determined of geospatial vector datasets available in a database stored in memory. Each of the geospatial vector datasets may correspond to the same spatial region as the geospatial imagery. According to exemplary embodiments, the evaluation module 220 may be executed to perform step 805.

In step 810, the geospatial vector dataset having the highest accuracy level is selected. The evaluation module 220 may also be executed to perform step 810 in accordance with exemplary embodiments. If only one geospatial vector dataset is available for the same spatial region as the geospatial imagery, that geospatial vector dataset will be selected.

In step 815, the selected geospatial vector dataset is aligned to the geospatial imagery when the selected geospatial vector dataset and the geospatial imagery are misaligned. In exemplary embodiments, step 815 can be performed by execution of the alignment engine 225 or modules thereof.

In step 820, the location of the feature on the geospatial imagery is determined based on the selected geospatial vector dataset. The locator module 230 can be executed to perform step 820 in exemplary embodiments.

In step 825, the location of the feature is provided via a display device. In alternative embodiments, information relating to the location of the feature is transmitted to a remote user or stored in memory.

Figure 9:
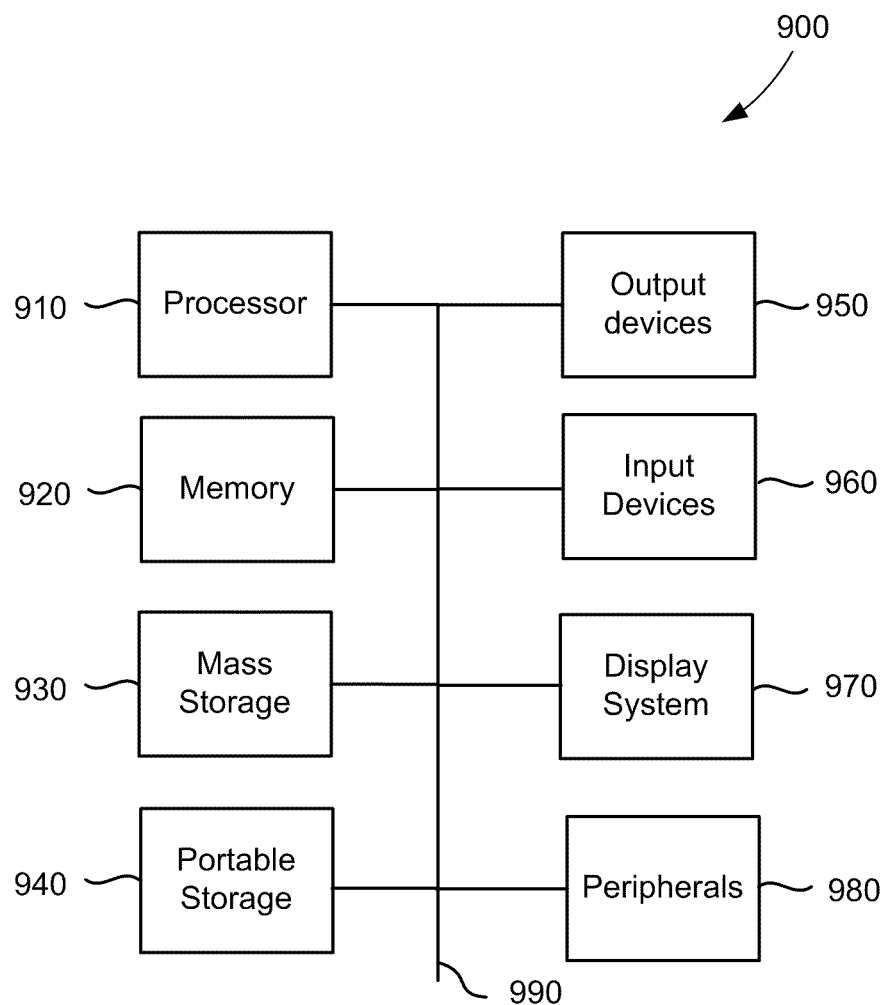
FIG. 9 illustrates an exemplary computing system 900 that may be used to implement an embodiment of the present technology.

FIG. 9 illustrates an exemplary computing system 900 that may be used to implement an embodiment of the present technology. System 900 of FIG. 9 may be implemented in the contexts of the likes of computing device 110, a server implementing geospatial imagery source 130, and a server implementing geospatial vector dataset source 140. The computing system 900 of FIG. 9 includes one or more processors 910 and main memory 920. Main memory 920 stores, in part, instructions and data for execution by processor 910. Main memory 920 can store the executable code when in operation. The computing system 900 of FIG. 9 further includes a mass storage device 930, portable storage device(s) 940, output devices 950, user input devices 960, a graphics display system 970, and peripheral devices 980.

The components shown in FIG. 9 are depicted as being connected via a single bus 990. The components may be connected through one or more data transport means. Processor 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk, digital video disc, or USB storage device, to input and output data and code to and from the computing system 900 of FIG. 9. The system software for implementing embodiments of the present invention may be stored on such a portable medium and input to the computing system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Suitable output devices include speakers, printers, network interfaces, and monitors.

Display system 970 may include a liquid crystal display (LCD) or other suitable display device. Display system 970 receives textual and graphical information, and processes the information for output to the display device.

Peripheral device(s) 980 may include any type of computer support device to add additional functionality to the computer system. Peripheral device(s) 980 may include a modem or a router.

The components contained in the computing system 900 of FIG. 9 are those typically found in computer systems that may be suitable for use with embodiments of the present invention and are intended to represent a broad category of such computer components that are well known in the art. Thus, the computing system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media can take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for locating a feature on geospatial imagery, the method comprising:
   selecting, via a computer, a first geospatial vector dataset of a plurality of geospatial vector datasets, the first geospatial vector dataset having a highest accuracy level in the plurality of geospatial vector datasets;
   aligning the selected geospatial vector dataset to the geospatial imagery wherein the aligning comprises:
      detecting a first group of control points in the selected geospatial vector dataset, and a second group of control points on the corresponding locations on geospatial imagery, detecting the second group of control points comprising:
         inferring a template from the selected geospatial vector dataset based on the first group of control points and the locations, shapes, and directions of surrounding roads or parcels;
         inferring pixels of the geospatial imagery corresponding to roads;
         matching the template shape with inferred pixels; and
         designating matched inferred pixels as corresponding control points in the second group; and
      distorting the selected geospatial vector dataset such that the first group of control points is aligned with the second group of control points;
   determining the location of the feature on the geospatial imagery based on the selected geospatial vector dataset; and
   outputting the location of the feature via a display device.

2. The method of claim 1, wherein a margin of error in the proximity of the determined location of the feature and an actual location of the feature is dependent, at least in part, on the accuracy level of the first geospatial vector dataset.

3. The method of claim 1, further comprising determining an accuracy level of each of the plurality of geospatial vector datasets stored in memory, each of the plurality of geospatial vector datasets corresponding to the same spatial region as the geospatial imagery.

4. The method of claim 3, wherein the accuracy level of each of the plurality of geospatial vector datasets is based, at least in part, on a type of dataset respectively included in each of the plurality of geospatial vector datasets.

5. The method of claim 3, wherein the plurality of geospatial vector datasets includes one or more of a building footprint vector dataset, a parcel vector dataset, or a road vector dataset.

6. The method of claim 1, wherein the aligning is performed when the selected geospatial vector dataset and the geospatial imagery are misaligned.

7. The method of claim 1, wherein detecting the first group of control points comprises:
   locating salient points in the selected geospatial vector dataset; and
   designating one or more representative points as control points in the first group, each representative point corresponding to a cluster of salient points.

8. The method of claim 1, wherein the distorting comprises rubber-sheeting the selected geospatial vector dataset.

9. A device for locating a feature on geospatial imagery, the device comprising:
   a memory for storing a program;
   a processor for executing the program;
   an evaluation module stored in the memory and executable by the processor to determine an accuracy level of each of a plurality of geospatial vector datasets available in a database and to select the geospatial vector dataset having the highest accuracy level, each of the plurality of geospatial vector datasets corresponding to the same spatial region as the geospatial imagery;

an alignment engine stored in the memory and executable by the processor to align the selected geospatial vector dataset to the geospatial imagery when the selected geospatial vector dataset and the geospatial imagery are misaligned, the alignment engine including:

a detection module stored in the memory and executable by the processor to detect a first group of control points in the selected geospatial vector dataset and a second group of control points on the geospatial imagery, the detection module further executable to detect the second group of control points by:
inferring a template from the selected geospatial vector dataset based on the first group of control points and the locations, shapes, and directions of surrounding roads or parcels,
inferring pixels of the geospatial imagery corresponding to roads,
matching a shape of the inferred template with inferred pixels, and
designating matched inferred pixels as corresponding control points in the second group; and a distortion module stored in the memory and executable by the processor and configured to distort the selected geospatial vector dataset such that the first group of control points is aligned with the second group of control points; and a locator module stored in the memory and executable by the processor to determine the location of the feature on the geospatial imagery based on the selected geospatial vector dataset or based on combined geospatial extents inferred from multiple geospatial vector datasets.

10. The device of claim 9, wherein the plurality of geospatial vector datasets includes one or more of a building footprint vector dataset, a parcel vector dataset, or a road vector dataset.

11. The device of claim 9, wherein the evaluation module determines the accuracy level of each of the plurality of geospatial vectors based, at least in part, on a type of dataset respectively included in each of the plurality of geospatial vector datasets.

12. The device of claim 9, wherein the detection module can be executed to detect the first group of control points by locating salient points in the selected geospatial vector dataset and designating one or more representative points as control points in the first group, each representative point corresponding to a cluster of salient points.

13. The device of claim 9, wherein the distortion module can be executed to distort the selected geospatial vector dataset by rubber-sheeting the selected geospatial vector dataset.

14. A non-transitory computer readable storage medium having a program embodied thereon, the program executable by a processor to perform a method for locating a feature on geospatial imagery, the method comprising:

selecting a first geospatial vector dataset of the plurality of geospatial vector datasets, the first geospatial vector dataset having a highest accuracy level in the plurality of geospatial vector datasets;

aligning the first geospatial vector dataset to the geospatial imagery when the first geospatial vector dataset and the geospatial imagery are misaligned wherein the aligning comprises:
detecting a first group of control points in the selected geospatial vector dataset,
inferring a template from the selected geospatial vector dataset based on the first group of control points and the locations, shapes, and directions of surrounding roads or parcels,
detecting a second group of control points on the geospatial imagery, the detecting the second group of control points comprising:
inferring pixels of the geospatial imagery corresponding to roads,
matching the shape of the inferred template with inferred pixels, and
designating matched inferred pixels as corresponding control points in the second group, and
distorting the selected geospatial vector dataset such that the first group of control points is aligned with the second group of control points; and determining the location of the feature on the geospatial imagery based on the selected geospatial vector dataset.

15. The computer readable storage medium of claim 14, wherein the method further comprises determining an accuracy level of each of the plurality of geospatial vector datasets stored in memory, each of the plurality of geospatial vector datasets corresponding to the same spatial region as the geospatial imagery.

16. The computer readable storage medium of claim 14, wherein detecting the first group of control points comprises:
locating salient points in the selected geospatial vector dataset; and
designating one or more representative points as control points in the first group, each representative point corresponding to a cluster of salient points.

17. The computer readable storage medium of claim 14, wherein distorting the selected geospatial vector dataset comprises rubber-sheeting the selected geospatial vector dataset.

* * * * *